Nov. 24, 1931.                    A. L. BIRDSALL                    1,833,669
                                   DOOR HANDLE
                               Filed June 22, 1931
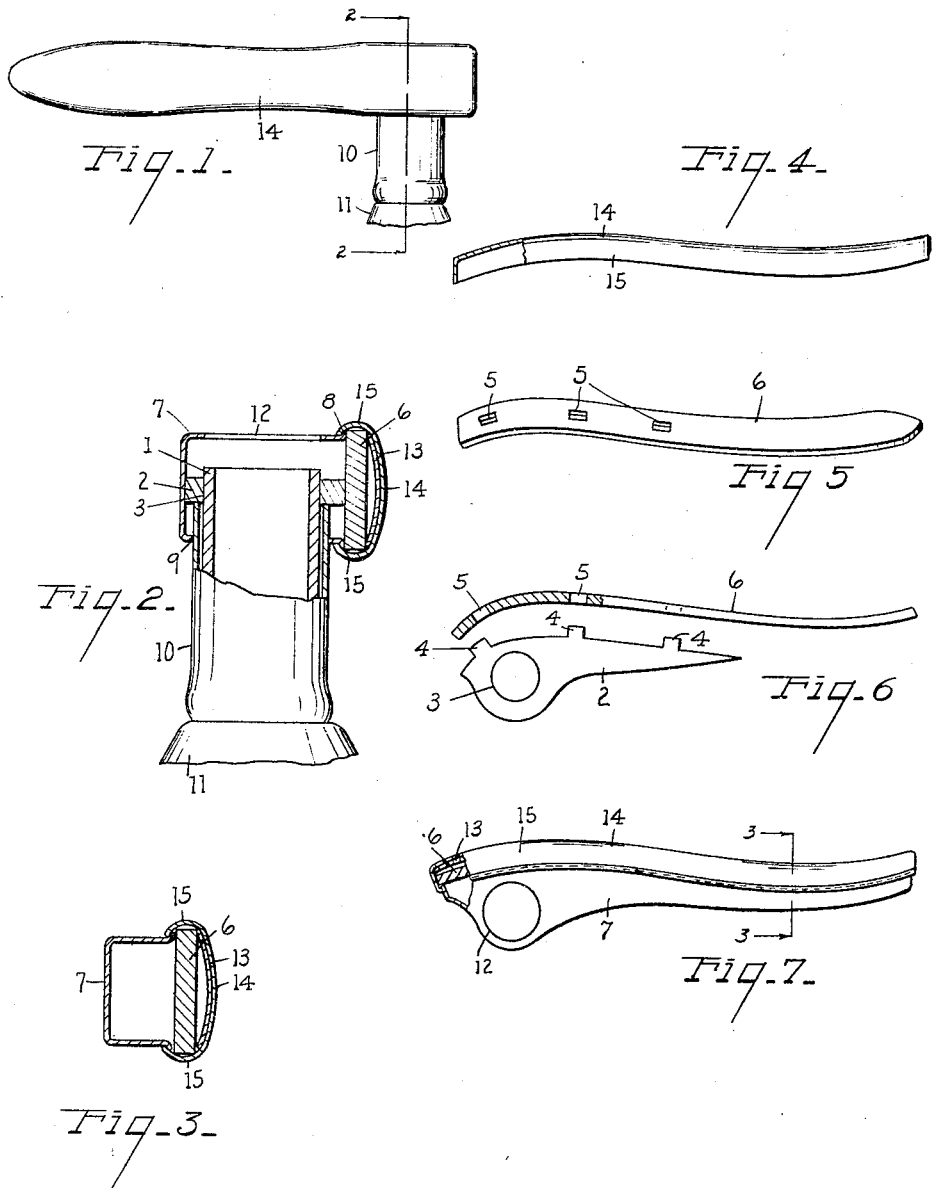
INVENTOR.
Albert L. Birdsall
BY
Chappell Earl
ATTORNEYS Patented Nov. 24, 1931

1,833,669

UNITED STATES PATENT OFFICE

ALBERT L. BIRDSALL, OF GRAND RAPIDS, MICHIGAN, ASSIGNOR TO KEELER BRASS COMPANY, OF GRAND RAPIDS, MICHIGAN

DOOR HANDLE

Application filed June 22, 1931. Serial No. 545,865.

The main object of this invention is to provide a handle for door latches such as automobile doors which may be provided with the desired finish, has a strong, massive attractive appearance, and at the same time is economical in structure.

A further object is to provide a structure in which the design may be very easily changed or modified.

Objects pertaining to details and economies of my invention will definitely appear from the description to follow. The invention is defined in the claims.

A structure which embodies the features of my invention is clearly illustrated in the accompanying drawings, in which:

Fig. 1 is a plan view of a structure embodying the features of my invention, a portion of the escutcheon being broken away.

Fig. 2 is an enlarged fragmentary view partially in section on line 2—2 of Fig. 1.

Fig. 3 is a cross section on line 3—3 of Fig. 7.

Fig. 4 is a fragmentary side view of the casing or front facing member.

Fig. 5 is a perspective view of the handle.

Fig. 6 is a disassembled view of the shank arm and handle bar, the handle bar being partially in section.

Fig. 7 is a fragmentary side view.

In the embodiment of my invention illustrated in the drawings the shank 1 of the handle is tubular to receive a lock unit. On this shank I fixedly mount an arm 2 having a hole to receive the shank. The shank arm has lugs or lift portions 4 on its upper edge adapted to engage the holes 5 in the handle bar 6. This handle bar is conformed to fit the upper edge of the arm and is secured thereto by upsetting the lugs 4.

The rear casing member 7 is of general channel cross section, being conformed to the desired design, and has out-turned flanges 8 on its edges which abut the rear side of the bar 6. This rear casing member has a hole 9 in its inner side for the shank, the hole being of suitable dimensions to receive the shank housing sleeve or finishing sleeve 10 which is disposed with its inner end in abutting relation to the arm 2. The sleeve is conformed at its inner end to fit the escutcheon 11.

The opening 12 in the outer side of the casing member 7 is designed to permit the insertion of the lock unit, not shown.

A filler plate 13 also of channel cross section is arranged on the front side of the handle bar and in supporting engagement with the outer casing member 14. This outer casing member is conformed to the shape of a handle and has side flanges 15 which closely embrace the edges of the handle, being clamped thereon and also overlapping the out-turned flanges 8 on the casing member 7, thereby locking the casing members upon the handle bar.

By this arrangement of parts a handle which is of relatively massive and attractive appearance can be very economically produced, and at the same time the handle is strong and durable.

Having thus described my invention what I claim as new and desire to secure by Letters Patent is:

1. The combination with a shank, of an arm having a hole to receive said shank fixed thereto, said arm having projecting lugs on its upper edge, a handle bar disposed on said arm and having holes therein engaged by said lugs, a conformed channeled rear casing member having out-turned flanges at its edges disposed in abutting relation to the rear side of said handle bar, said rear casing member having an opening to receive said shank, and a conformed casing arranged to embrace the edges of said handle bar and the flanges of said rear casing member.

2. The combination with a shank, of an arm, a handle bar disposed on said arm, a channeled rear casing member having out-turned flanges at its edges disposed in abutting relation to the rear side of said handle bar, said rear casing member having an opening to receive said shank, and a casing arranged to embrace the edges of said handle bar and the flanges of said rear casing member.

In witness whereof I have hereunto set my hand.

ALBERT L. BIRDSALL.